(12) United States Patent  
Michels

(10) Patent No.: US 8,714,904 B2  
(45) Date of Patent: May 6, 2014

(54) APPARATUS FOR LIFTING A GROUP OF CONTAINERS OR THE LIKE

(75) Inventor: Frank Michels, Kleve (DE)

(73) Assignee: MSK-Verpackungs-Systeme GmbH, Kleve (DE)

( * ) Notice: Subject to any disclaimer, the term of this patent is extended or adjusted under 35 U.S.C. 154(b) by 0 days.

(21) Appl. No.: 13/193,675

(22) Filed: Jul. 29, 2011

(65) Prior Publication Data

US 2011/0286825 A1 Nov. 24, 2011

Related U.S. Application Data

(62) Division of application No. 11/906,320, filed on Oct. 1, 2007, now Pat. No. 8,356,965.

(30) Foreign Application Priority Data

Oct. 4, 2006 (DE) ..................... 20 2006 015 281 U

(51) Int. Cl.
*B65G 1/18* (2006.01)

(52) U.S. Cl.
USPC .......................................... 414/799; 414/564

(58) Field of Classification Search
USPC ........ 414/568, 788, 791.6, 792.8, 793.4, 799,
414/924, 789.9, 790.7, 790.8, 791.7, 791.8,
414/792.6, 794.4, 794.5; 198/418, 426,
198/429, 468.8, 772, 773; 294/81.54,
294/81.55, 68.2

See application file for complete search history.

(56) References Cited

U.S. PATENT DOCUMENTS

| | | | | |
|---|---|---|---|---|
| 5,073,081 | A * | 12/1991 | Johnson | 414/802 |
| 7,393,176 | B2 * | 7/2008 | Bolzani | 414/799 |
| 7,581,919 | B2 * | 9/2009 | Bolzani | 414/799 |
| 8,257,012 | B2 * | 9/2012 | Silva | 414/799 |
| 2005/0265816 | A1 * | 12/2005 | Blanc | 414/799 |
| 2005/0265817 | A1 * | 12/2005 | Blanc | 414/799 |

* cited by examiner

*Primary Examiner* — Saul Rodriguez  
*Assistant Examiner* — Glenn Myers  
(74) *Attorney, Agent, or Firm* — Andrew Wilford

(57) ABSTRACT

An array of objects stands on a flexible web on a horizontal support, and a frame at the accumulation region gathers the objects at the downstream end into a group having a plurality of transverse rows. A transport element formed as a blind has an end edge and is shifted shiftable atop the web upstream in the direction between a ready position with the end edge spaced from the group standing on the web and a pickup position underlying the entire group. A lifting element underneath the web moves jointly with the transport element such that the web is raised immediately upstream of the end edge of the transport element to raise downstream edges of the objects and the transport element is engageable between the objects in the group and the web so the transport element can slide underneath the objects in the group.

8 Claims, 11 Drawing Sheets

APPARATUS FOR LIFTING A GROUP OF CONTAINERS OR THE LIKE

CROSS REFERENCE TO RELATED APPLICATIONS

This application is a division of copending U.S. patent application Ser. No. 11/906,320 filed 1 Oct. 2007 with a claim to the priority of German patent application 10 2006 015 281 filed 4 Oct. 2006.

FIELD OF THE INVENTION

The invention relates to an apparatus for lifting a group of containers or the like, in particular consisting of a plurality of rows of containers or the like that are preferable arranged in parallel next to one another, comprising a base and a lifter, wherein the lifter has a transport surface that is formed in particular as a blind that can be displaced parallel to the base and preferable also comprising a frame that is embodied in such a manner that the frame can be wrapped around by being slipped around the group of containers or by feeding the containers into the frame, wherein, prior to the lifting of the group of containers, the lifter is moved toward the group of containers in such a manner that the transport surface that has not yet been extended into its lifting position, is located with its front edge in front of the first row of the group of containers and is then moved underneath the group of containers into its lifting position by a relative movement with respect to the containers underneath the containers standing on the base. Containers also include individually packaged goods, such as for example cans, bottles, hollow glass, container glass or buckets that encompass a platform on the lower side, with which they can be set up on a base.

BACKGROUND OF THE INVENTION

In the industry, for example in the glass industry or in the container industry, the produced containers, such as for example bottles, must be moved from a base to a pallet. On the pallet, a group of containers that are then later secured by a film tube, which is slipped thereover, are then stacked on top of one another. Typically, the base is a revolving conveyor belt that transports the containers. The containers are then piled up on a platform that corresponds to the pallet size, by a stop. This region is also called the accumulating area. As soon as a group of containers is complete, the containers are picked up by a lifter and are deposited on a pallet and on the upper layer of a stack of pallets that has already been deposited, respectively.

In a known apparatus, a height-adjustable lift table borders on the accumulating area for this purpose. The group of individually packaged goods, such as containers, is horizontally pushed onto the displacement table. Then, the displacement table, which in turn borders on the pallet, is displaced into the desired height so that the group of individually packaged goods, such as containers, is pushed onto the pallet in a last step or—provided that a plurality of layers of containers are already stacked on top of one another on the pallet, is pushed onto the intermediate floor panel, which was placed onto the last deposited group of containers on the upper side.

A disadvantage is hereby that, due to the displacement table that must additionally be height-adjustable, such apparatuses require an increased amount of space. Furthermore, the possibilities of disposing the accumulating area and the deposition area are limited because of the displacement table that is disposed therebetween. In addition, such apparatuses can be used only to a limited extent, for example for containers with very small diameters, because of the transitions between the accumulating area and the displacement table on the one hand and the displacement table and the deposition area on the other hand.

OBJECT OF THE INVENTION

It is the object of the invention to avoid the afore-mentioned disadvantages and to specify an apparatus that makes it possible, with a small space requirement, to move the individually packaged goods, such as containers or cans, for example, from the lift table and the accumulating area into the deposition area, that is, onto the pallet, without considerably changing a layer pattern created on the lift table. At the same time, the apparatus is to also enable the movement of containers of different diameters and/or shapes, without requiring an adaptation.

SUMMARY OF THE INVENTION

An apparatus for handling an array of objects has a horizontal support having a flat and horizontal upper face defining and extending upstream and downstream in a predetermined direction underneath an accumulation region, a flexible web overlying the support, the array of objects standing on the web and pressing same down against the support, a frame at the accumulation region for gathering the objects at the downstream end into a group having a plurality of rows transverse to the direction, and a transport element formed as a blind of an array of transverse slats, having an end edge, and shiftable atop the web upstream in the direction between a ready position with the end edge spaced from the group standing on the web and a pickup position underlying the entire group. This transport element can move upstream in the direction and on top of the web between the ready position and the pickup position. A lifting element underneath the web is coupled for joint movement in the direction with the transport element such that on upstream movement of the transport element from the ready position to the pickup position the web is raised immediately upstream of the end edge of the transport element to raise downstream edges of the objects and the transport element is engageable between the objects in the group and the web, whereby the transport element can slide underneath the objects in the group. The transport element is raised in the pickup position to lift the group of objects up off the web.

According to another feature of the invention, this object is solved in that the apparatus is embodied in such a manner that a partial region of the base is located underneath each container at every point in time and where at the row of containers underneath which the transport surface is relocated next, a clearance is given at least on its side facing the transport surface between the bottoms of the containers of this row and the base, in particular the clearance was preferably created only temporarily so that the transport surface can be guided underneath the containers of the row. By means of the clearance, which is given and created on the side of the base that faces the transport surface between the bottoms of the containers of the row and the base, the base can be guided down, without touching the containers laterally while moving the transport surface downward, which can lead to damages.

With a possible embodiment of the apparatus, the containers of the row can be grouped on the upper side, for example by a stop that can be displaced in vertical direction, by tapping so that a clearance can thus be created and so that the base can thus be passed from below. Other constructive measures for creating a clearance are possible.

The apparatus as claimed in the invention thus allows for a direct take-over of the containers from the accumulation table and the accumulating area so that a displacement table, which requires additional space, is no longer required, as was the case until now. At the same time, the apparatus as claimed in the invention enables such a takeover, where the layer pattern created on the lift table and the accumulation table is not considerably changed in response to the takeover. Containers with different diameters and shapes can also be taken over by the apparatus as claimed in the invention, without requiring a special adaptation, such as for example other gripper tools or suction plates, on the objects that are to be taken over.

The containers of adjacent rows can be disposed to one another according to the type of a chessboard. However, it is also quite possible that adjacent rows are arranged to one another offset by half of the diameter of a container. The outer contour of the group of containers is also arbitrary. It goes without saying that other layer patterns are also possible.

On its surface facing the transport surface in the region, which, on the one hand, borders on the row of containers, underneath which the transport surface is relocated next and, on the other hand, faces the transport surface, which was not yet passed from below, the base can encompass at least one recess and the transport surface at the front edge in a conveyor direction can have at least one front edge region that is embodied in such a manner and which, in response to a movement of the transport surface into its lifting position, can be inserted into the corresponding recess and can, in this respect, be passed underneath the row of containers. The insertion of the respective front edge regions of the front edge into the corresponding recess, the transport surface can simply be passed underneath the row of containers, because the containers of this row are not contacted in the region of their side walls.

Preferably, provision can be made for a plurality of recesses that are oriented parallel to the conveyor direction and which are formed in a groove-shaped manner. Provided that the base is stationary, the recesses must extend across the complete length of the group of containers. This must not be the case, if, for example, the base together with the transport surface moves in the conveyor direction when the transport surface is passed from below.

At least one recess can be formed as a groove that is orthogonal to the conveyor direction. Due to the fact that the front edge is located in the recess when being passed from below, the base must be moved synchronously with the transport surface when passing the transport surface from below in the conveyor direction. It is obvious that the recess must not be continuous across the entire width of the base and of the row of containers, respectively. It is quite possible that provision is made for recess partial regions at least at the same spacing from the containers along the row, wherein the front edge with the correspondingly embodied front edge regions can be inserted into the corresponding recess partial regions. The distance of the recess partial regions and the width of the recess partial regions is a function of the diameter and of the dimensions of the containers, respectively.

Preferably, the base can be flexible, at least in displacement direction. It goes without saying that the base can also be flexible orthogonally to the displacement direction. In such an embodiment, the base is a conveyor belt, for example.

The base can be a conveying surface that can be moved in the displacement direction and which preferably consists of a plurality of segments that are connected with one another in an articulated manner via elements by axles that are oriented perpendicular to the displacement direction. If a segment extends across the complete width of the base, for example, provision can be made for a continuous groove as a recess.

It goes without saying that the recesses can also extend parallel to the conveyor direction. In such a case, the base can also be stationary. The transport surface extends with the front edge regions into the respective recess and can be passed underneath the row of containers. The distance of the recess oriented parallel to the conveyor direction is a function of the size of the containers.

In the alternative, provision can be made for a lifter that lifts the base, wherein the lifter in the conveyor direction in the region which, on the one hand, borders on the row of containers, underneath which the transport surface is relocated next and, on the other hand, faces the transport surface that was not yet passed from below that is disposed at a slight distance from the front edge of the transport surface and which is disposed so as to be displaceable synchronously with the transport surface that can be displaced in the lifting position. The distance of the lifter to the row of containers, underneath which the transport surface is relocated next, is smaller than half of the diameter of the containers that are to be lifted, and half of the depth of the individually packaged goods that are to be lifted, respectively. A clearance is initially created by the lifter so that the transport surface can then be passed from below.

The lifter can be coupled with the transport surface via a connecting element that creates a constant distance.

In the alternative, the lifter can be displaced via a separate drive.

So that the lifter can be moved back into its initial position after reaching the lifting position of the transport surface in a simpler manner, it lends itself for the lifter to be positioned so as to be capable of being lowered. This is so because the base is no longer lifted when the lifter is moved back, due to the lowering.

The lifter can be an elevation, which is laterally flattened, preferably in the cross-section at least in the conveyor direction and which extends across the entire width of the row. The lifter must not have the same height across the entire width of the row.

Preferably, the lifter can consists of at least two surface elements that are located in one plane that can be moved relative to one another in the plane into a position, in which they are fit into one another on the one hand and in an adjoining position on the other hand, wherein the edges of the respective surface elements each pointing toward one another are embodied in a comb-shaped manner and encompass surface partial regions that are disposed offset to one another and protruding in the plane. Upon moving the lifter toward the group of containers that is to be accommodated, the surface elements are in the mutually adjoining position. The transport surface together with the adjoining surface element is then displaced in a synchronous manner. In response to this relative movement, the two comb-shaped surface elements are displaced into one another. Once the transport surface reaches its lifting position, the surface elements are in a position, in which they are fit into one another. Instead of the comb-shaped embodiment of the edges of the respective surface elements that each point toward one another, other embodiments, for example scissor mechanisms, are, of course, also possible. They are embodied in such a manner that the containers are held in the mutually adjoining position of the surface elements as well.

Preferably, the conveying edge of the transport surface can encompass a surface that runs downward to the free end and in a sloped manner downward to the base, so as to simplify even more the passing from below due to the tapering front edges.

The containers of this row can thereby be lifted at least in the region of their side that faces the transport surface. It goes without saying that the containers of this row can also be lifted in their entirety.

In the alternative, the base can be lowered in the region that, on the one hand, borders on the row of containers, underneath which the transport surface is relocated next and which, on the other hand, faces the transport surface that was not yet passed from below. It goes without saying that a lowering of the base in combination with a lifting of the containers of this row is also possible at least in the region of its side that faces the transport surface.

With the containers of this row, a clearance can initially only be created on its side that faces the transport surface and the orientation of the containers can be changed, in particular in response to an underpassing of the transport surface caused by a contact of the front edge of the transport surface with at least one region of the underside of the containers. The creation of the clearance in the first step can occur with or without a change of the orientation of the containers. If, for example, the containers in this row are initially lifted slightly only on their side that faces the transport surface, whereby the orientation of the containers of this row changes, the orientation of the containers is once again changed in response to guiding the transport surface downward in response to a contact of the front edge of the transport surface with at least one region of the underside of the containers.

In the alternative, such a clearance between the bottoms of the containers of this row and the base can be created with the row of containers, underneath which the transport surface is relocated next, such that, upon underpassing the transport surface, the orientation of the containers remains substantially unchanged. With such a process, the created clearance is sufficient for maintaining the orientation of the containers that are spaced apart by means of a clearance to the transport surface, in response to an underpassing of the transport surface.

The row of containers, underneath which the transport surface is relocated next, can be located approximately orthogonally to the conveyor direction on the plane of the transport surface. It goes without saying that the front edge of the transport surface can also be oriented in an angle that does not equal 90° to the conveyor direction so that the containers of the row, underneath which the transport surface is to be guided next, are located in "different" rows, as compared to the layer. It goes without saying that, with a corresponding constructive embodiment, the row of containers, underneath which the transport surface is relocated next, can also be embodied in a different manner, such as for example in a zigzag.

Provision can be made for a conveyor belt as a base, on which the group of containers is created with the desired layer pattern by piling or by a further device. For example, the containers can be piled up in front of a stop that is oriented in particular at right angles to the conveyor, or they can be assembled free and with zero pressure by the device. It goes without saying that, in such an embodiment, only a partial region of the conveyor belt is underneath the group of containers at any given point in time. In response to a movement of the conveyor belt, the containers are piled up in front of the stop until a full group of containers is produced. Then, the lifter is moved toward the group of containers in such a manner that the transport surface that has not yet been extended into its lifting position, is located with its front edge in front of the first row of the group of containers and is then moved underneath the group of containers into its lifting position by a relative movement with respect to the containers underneath the containers standing on the base.

BRIEF DESCRIPTION OF THE DRAWING

Specific embodiments of the invention illustrated in the drawings will be explained below.

The same reference numerals are used in all of the figures for the same and similar components.

DETAILED DESCRIPTION

Figure 1:
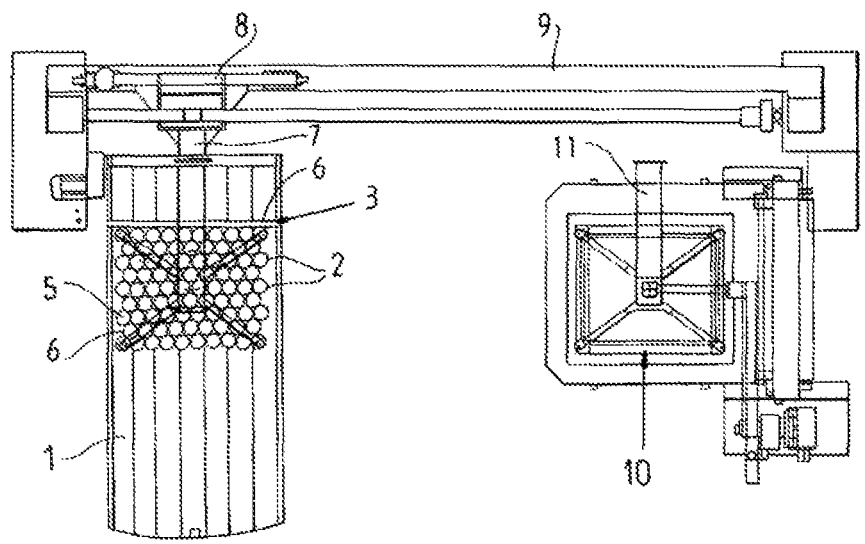
FIG. 1 shows a top view of a palletizer comprising an accumulation table and a deposition area.
Figure 2:
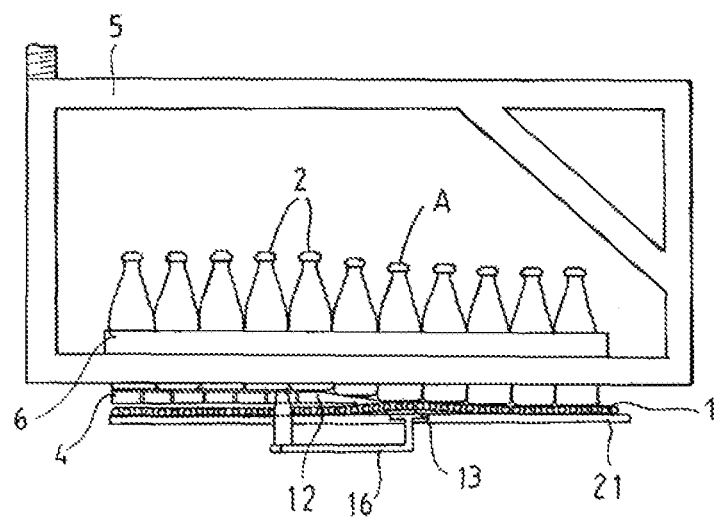
FIGS. 2-7 show a first embodiment of an apparatus according to the invention.
Figure 3:
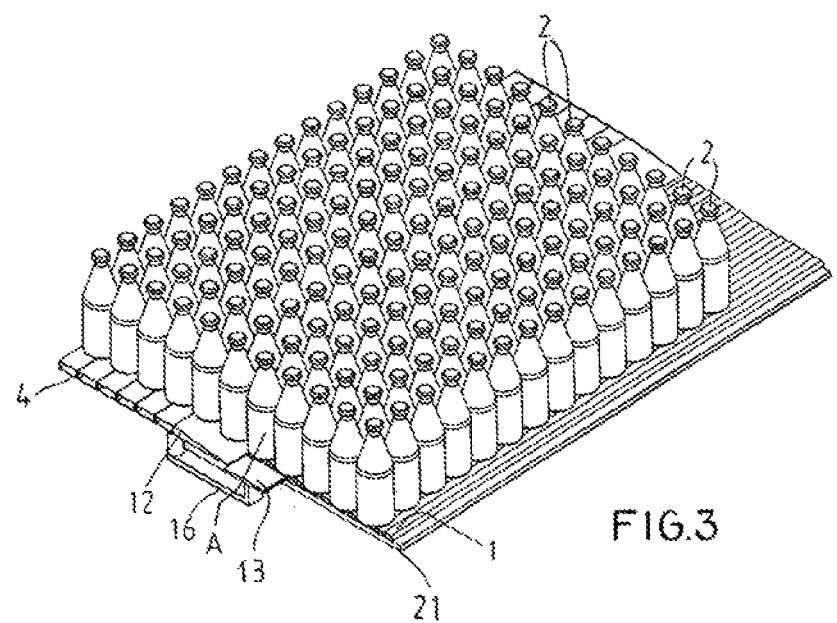
Figure 4:
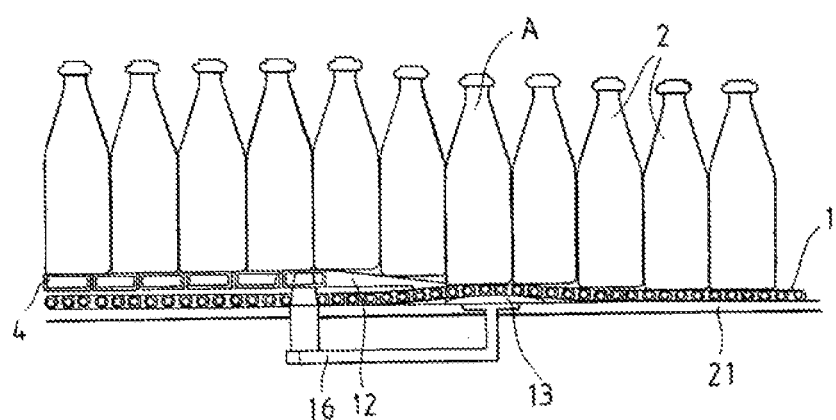

FIG. 1 is a top view of a palletizer. A conveyor belt forming a support 1 is located in the left-hand part of FIG. 1. As in FIGS. 2 to 21, the conveyor belt 1 moves continuously and is deflected between two unillustrated deflection rollers. At the same time, the part of the conveyor belt 1 illustrated in FIG. 1 forms the accumulating area. A group of containers 2 is stacked up in front of an unillustrated stop in the accumulating area.

Furthermore, a lifter 3 has a transport surface 4 that can be moved parallel to the base 1 and is formed from an array of parallel hinged-together slats as a blind having a frame 5. In the illustrated embodiment, the frame 5 has four flanges 6 that can be moved to gather the containers 2 into a centered group.

The lifter 3 is secured to a carriage 8 by a support structure 7. The support structure 7 permits vertical movement of the lifter 3. For horizontal displacement, the carriage 8 can ride along a guide rail 9. The deposition area in which the layers are deposited on a pallet 10, is located parallel to and at a spacing from the accumulating area.

So that groups of containers 2 that are stacked on top of one another are not in direct contact with one another, an intermediate floor panel is placed on top of an already deposited group of containers by a intermediate floor-panel application device 11 before the next group of containers is deposited.

After depositing the layer or group of containers 2, the lifter 3 is again moved back to the accumulation table. Prior to lifting the group of containers, the lifter 3 is moved toward the group of containers that is to be lifted such that the transport surface 4 that has not yet been extended into its lifting position is positioned with its front edge 12 in front of the first row of the group of containers and is then moved underneath the group of containers into its lifting position by relative movement with respect to the containers 2 underneath the containers 2 standing on the base 1. After the new group of containers has been lifted, the lifter 3 is again moved into the deposition area and the group of containers is deposited on the intermediate floor panel. This process is repeated until the desired number of layers has been deposited. Then, the pallet 10 carrying the layers is transported away and a new pallet 10 is deposited in the deposition area.

FIGS. 2 to 7 illustrate an embodiment where provision is made for a lifter 13 underneath the base 1. The lifter 13 is formed as a raised surface that is laterally flattened, preferably in the cross-section at least in a conveyor direction 14 and that extends across the entire width of the row. The lifter 13 is disposed underneath the conveyor belt that forms the base 1.

Figure 5:
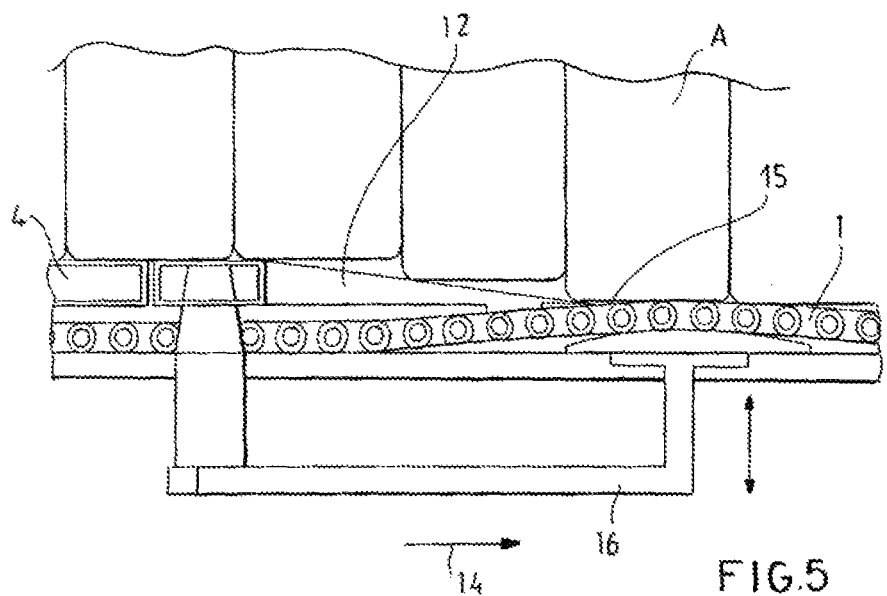
Figure 7:
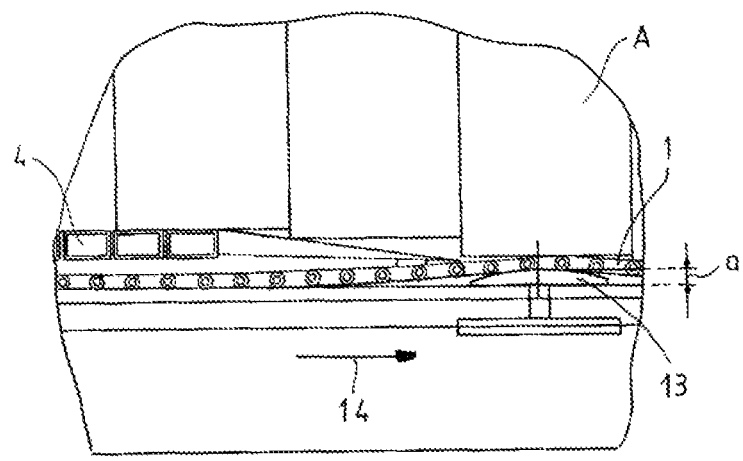
Figure 8:
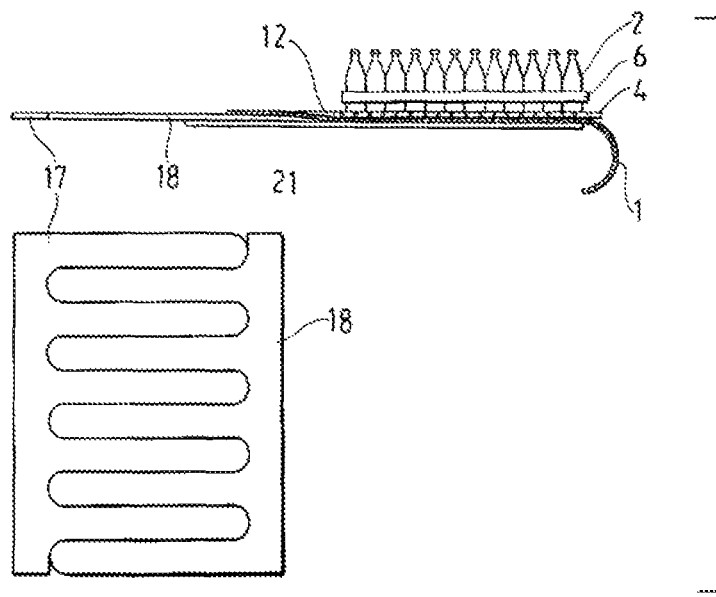
FIGS. 8-13 show a second embodiment of an apparatus according to the invention.

As is suggested in particular in FIG. 5, the lifter 13 effects a local lifting of the base 1 by the height "a" (FIG. 7). Consequently, in the row A of containers 2, underneath which the transport surface 4 is relocated next, a clearance 15 is created on its side facing the transport surface 4 between the bottoms of the containers 2 of this row A and the base 1. This clearance 15 permits a simple engagement of the transport surface 4 underneath the containers 2 of this row A. This lifting continues row for row until the transport surface 4 has passed underneath all of the containers 2 of the layer and has thus reached its lifting position.

In the positions illustrated in FIGS. 2 to 7, the transport surface 4 has been passed underneath approximately half of the rows of the group of containers. For better passing underneath, the front edge 12 of the transport surface 4 has a surface that runs downward to the free end and in a sloped manner downward to the base 1.

In FIGS. 2 to 5, the lifter 13 is coupled with the transport surface 4 via a connecting element 16 that creates a constant spacing. So that the lifter 13 can be moved back into its initial position after reaching the lifting position of the transport surface 4 in a simpler manner, the lifter 13 is supported in the direction of the illustrated arrow so as to be capable of being lowered. This way, the base 1, due to the lowering of the lifter 13, is no longer lifted when the lifter 13 is moved back to its starting position.

Figure 6:
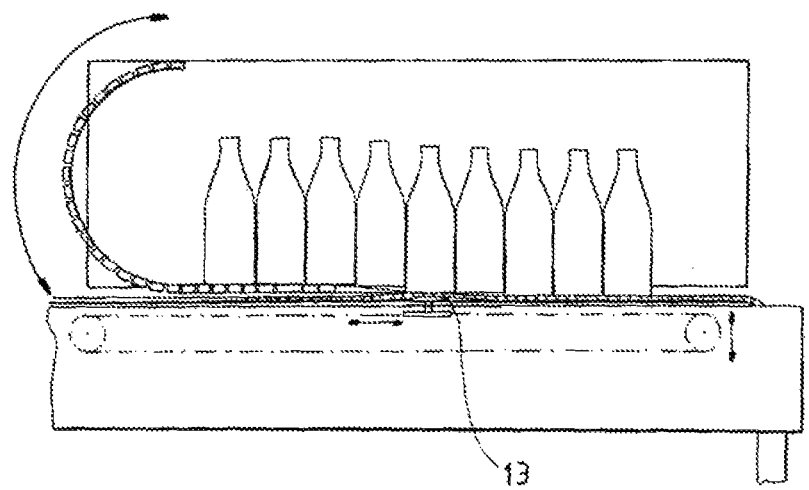

In FIGS. 6 and 7, the lifter 13 can be displaced synchronously with the transport surface 4 via a separate drive.

FIGS. 8 to 13 illustrate an alternative embodiment of a lifter 13. In this illustrated embodiment, the lifter 13 consists of two surface elements 17, 18 that are located in one plane with the edges of both of the surface elements 17, 18 pointing toward one another, and are formed as combs that have surface partial regions 19, 20 that are offset to one another and extend in the plane.

Contrary to the embodiment according to FIGS. 4 to 7, in which substantially only the row A is lifted by the lifter 13, all of the containers 2 are located at the same height in the embodiment according to FIGS. 8 to 13.

The surface elements 17, 18 are supported from underneath on a slide rail 21. The surface element 17 at the left-hand side in these figures is stationary, while the surface element 18 on the right-hand side in these figures can be moved synchronously with the transport surface 4. For this purpose, provision is made for an unillustrated drive, for example.

The relative position of the two surface elements 17, 18 to one another is illustrated in FIGS. 8 to 11 in the left-hand lower region of the figure in top view. For reasons of simplification, FIGS. 8 to 11 do not illustrate the conveyor belt on the side of the group of containers that is located opposite the transport surface 4 so that, because of this, the surface element 17 located underneath the conveyor belt is visible.

Figure 10:
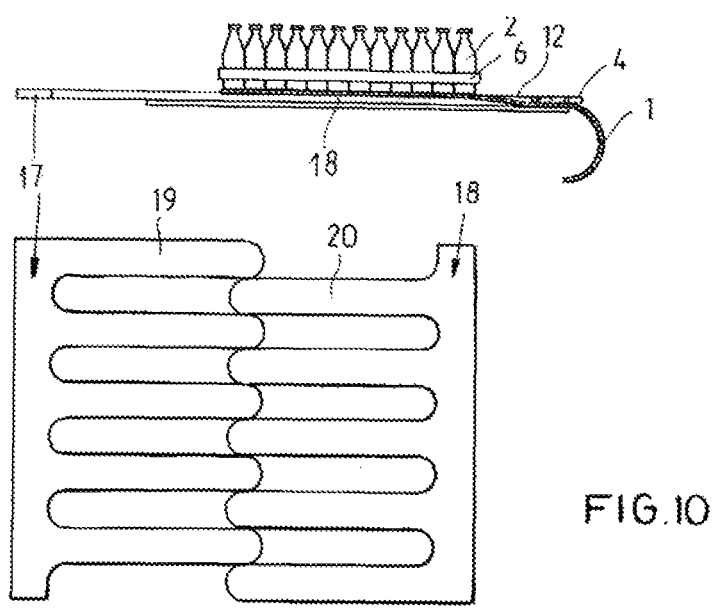

In FIG. 10, the surface elements 17, 18 are located in a mutually adjoining position. The transport surface 4 is then also not yet in its lifting position. The width of the surface partial regions 19, 20 is matched with the diameters of the containers 2. The smaller the diameters of the containers 2, the smaller the width of the surface partial regions 19, 20.

Figure 12:
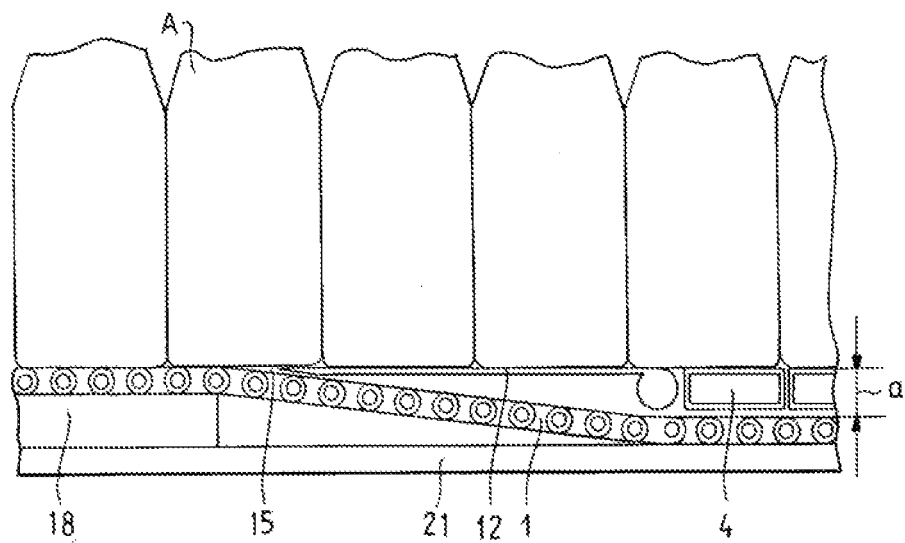

If the transport surface 4 is moved in the direction of the left surface element 17 together with the right surface element 18, that is, in the conveyor direction 14 (FIG. 7), as is illustrated in FIG. 12, before the base 1 is lowered, a clearance 15 is created between the bottoms of the containers 2 of the row A and the base 1, underneath which the transport surface 4 is moved next, on its side facing the transport surface 4. The transport surface 4 can thus be guided underneath the containers 2 of this row A.

This clearance 15 is formed in that the conveyor belt in this region is lowered by the height "a" by the surface element 18. The lowering can be justified by the dead load of the base 1. However, it is also quite possible that the base 1 is guided downward by an unillustrated structure for example in the form of a roller assembly, wherein this structure can be displaced synchronously in the direction 14 with the transport surface 4.

In the illustrated embodiment, the height "a" corresponds approximately to the height of the transport surface 4 and is approximately 20 mm in regions in which the transport surface 4 is located above the conveyor belt, the conveyor belt is in contact with the slide rail 21 and is thus lower by the height "a" than the regions that are in contact with the surface elements 17, 18, that is, the lifter 13. This also applies for the embodiment of the lifter 13 according to FIGS. 2 to 7.

Figure 9:
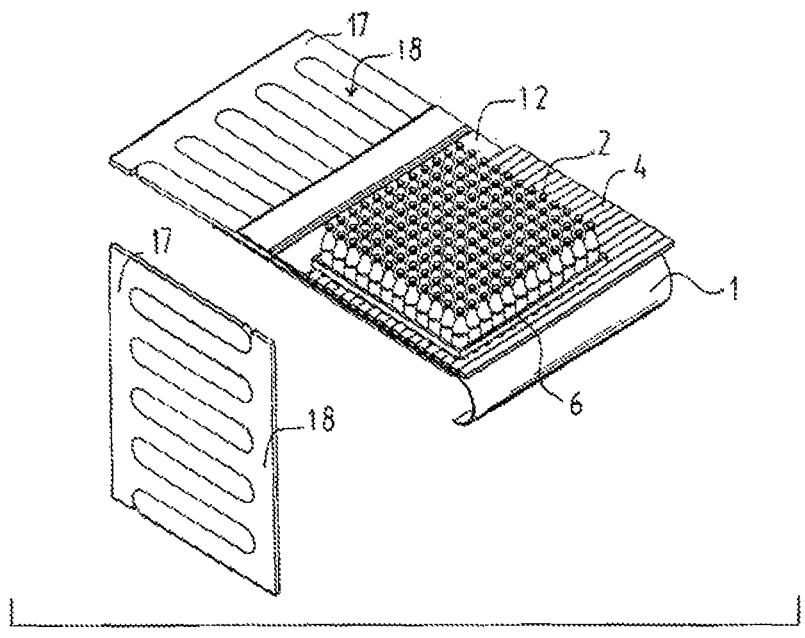
Figure 13:
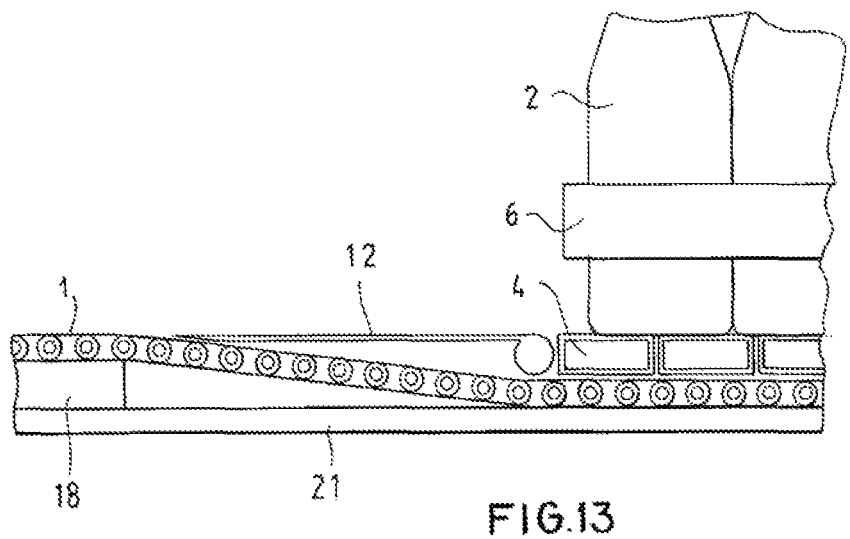
Figure 14:
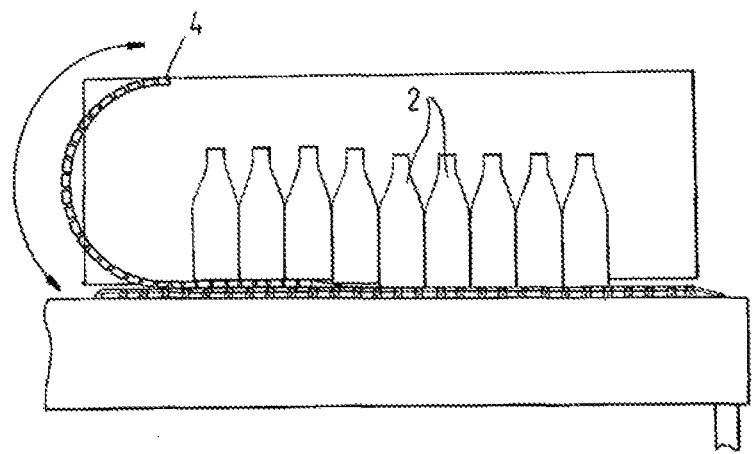
FIGS. 14-18 show a third embodiment of an apparatus according to the invention.
Figure 15:
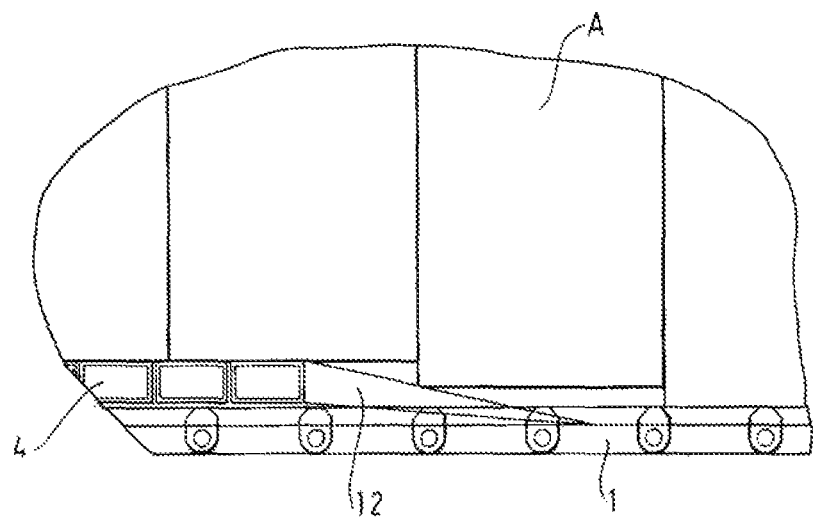
Figure 16:
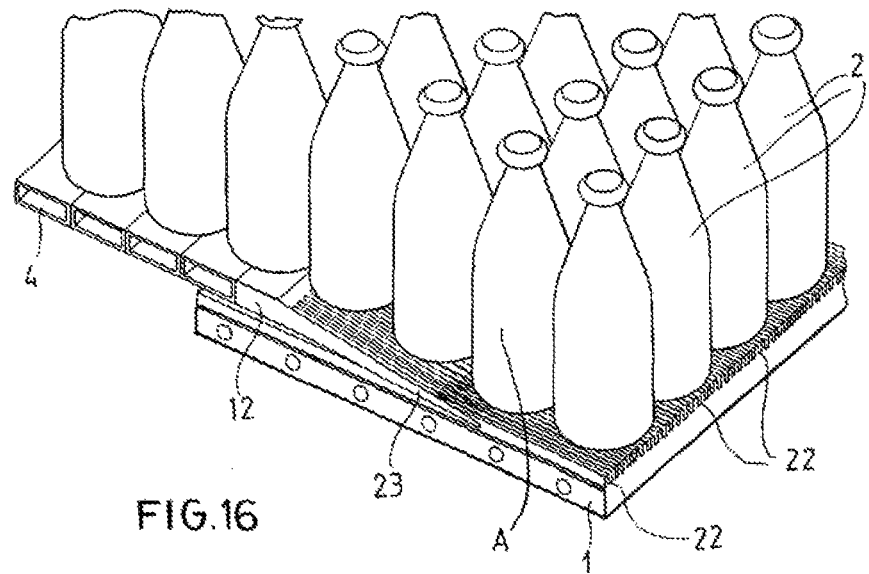
Figure 17:
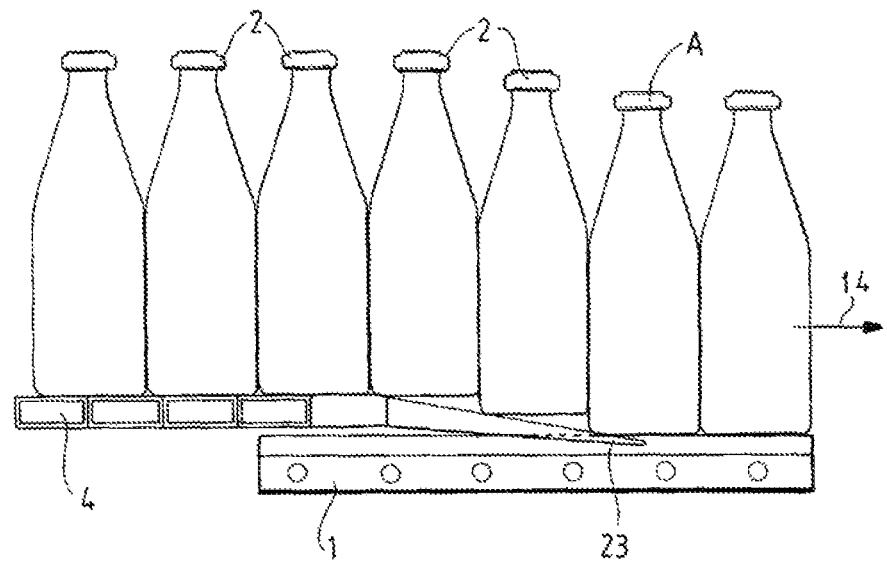

In FIGS. 9 and 13, the transport surface 4 is in its lifting position, that is, it has been passed underneath all of the containers 2 of this layer. The surface elements 17, 18 are then also in the position, in which they are fitted into one another. The group of containers can then be lifted by the lifter 3.

Figure 11:
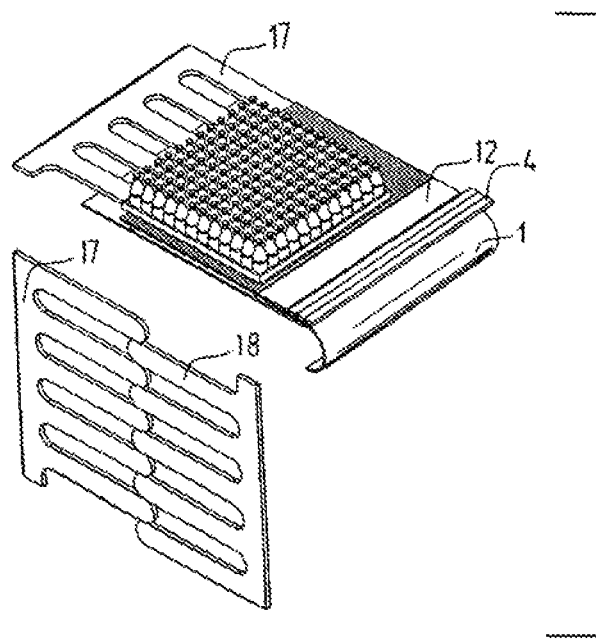

After the group of containers has been lifted by the lifter 3, the right-hand surface element 18 is again relocated into the position illustrated in FIGS. 10 and 11. A new group of containers 2 is then piled up on the base 1 and the lifter 3 comprising the frame 5 is positioned around the group of container 2, with the transport surface 4 not yet located in the lifting position. By moving the right-hand surface element 18 together with the transport surface 4, the transport surface 4 can then again be passed underneath the group of containers.

Figure 18:
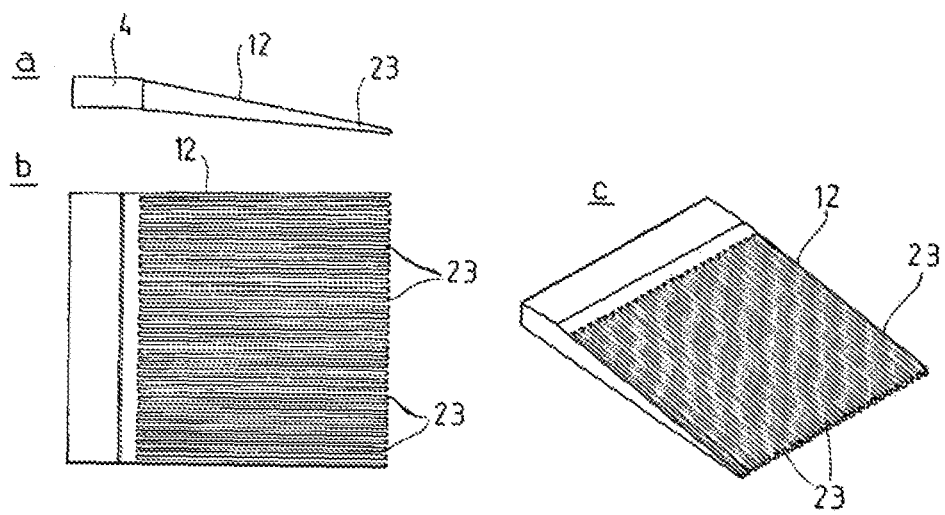
Figure 19:
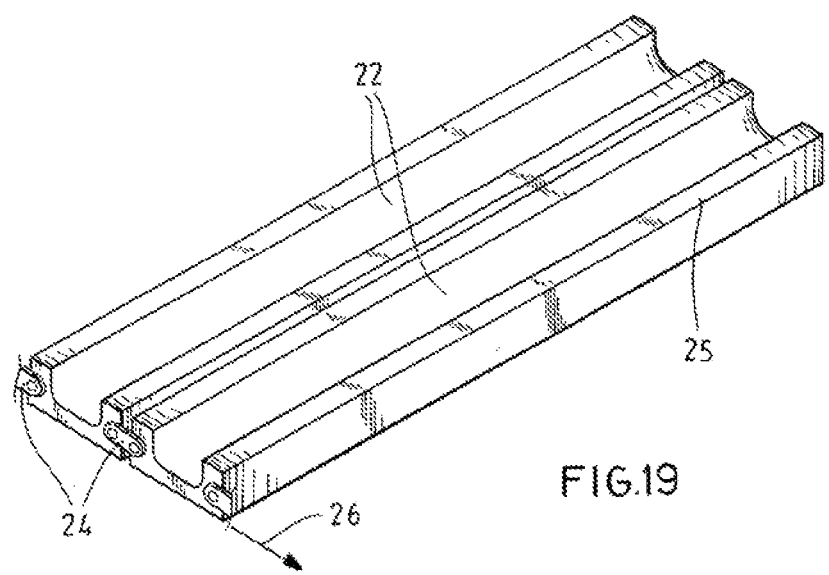
FIGS. 19 and 20 show a fourth embodiment of an apparatus according to the invention.
Figure 20:
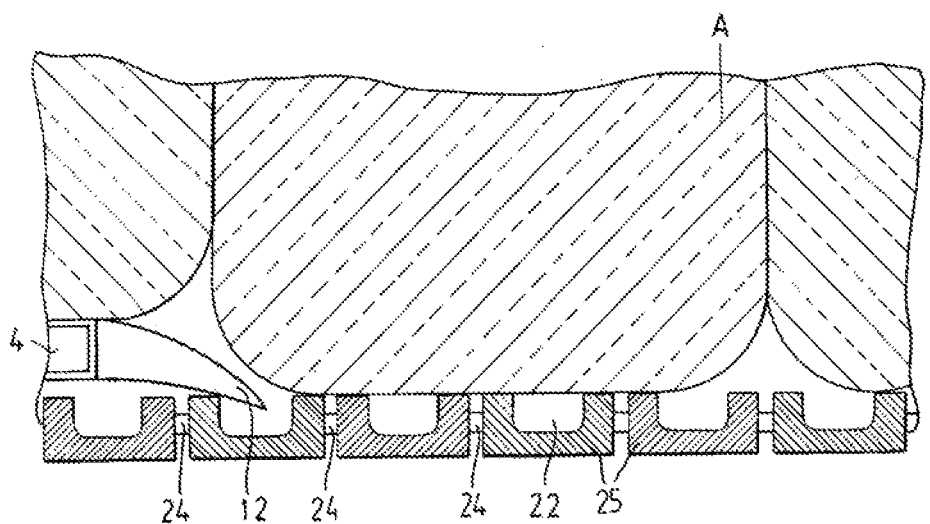

FIGS. 14 to 18 on the one hand as well as FIGS. 19 and 20 on the other hand, illustrate embodiments, where under the row A of containers 2, underneath which the transport surface 4 is relocated next, a clearance 15 is formed at least on its side facing the transport surface 4 between the bottoms of the containers 2 of this row A and the base 1.

In the embodiment according to FIGS. 14 to 18, the base 1, that is, the conveyor belt, has on its surface facing the transport surface 4, groove-shaped recesses 22 that are oriented parallel to the conveyor direction 14. At the same time, the transport surface 4, at its front edge 12 in the conveyor direction 14, has comb-shaped front edge regions 23 each fitting into a respective one of the recesses 22. The front edge regions 23 can be inserted into the corresponding recesses 22 and can moved therein. This can clearly be seen in the sloped top view in FIG. 16 as well as in the side view according to FIG. 17.

The spacing of the recesses 22 is matched with the size of the containers 2 that are to be lifted. In the embodiment illustrated in FIG. 16, provision is made for a plurality of recesses 22 underneath each container 2. By moving the transport surface 4 in the conveyor direction 14, the transport surface 4 can be easily passed underneath the group of containers, due to the guidance of the front edge region 23 in the recesses 22. In this illustrated embodiment, the base 1 can also be stationary. In FIG. 18, the front edge 12 of the transport surface 4 is illustrated from different directions. It can clearly be seen that the front edge 12 is embodied so as to run downward in a slanted manner so that the height from the front edge regions 23 to the transport surface 4 increases.

The embodiment of the base 1 can be variable. The base 1 can be stationary so that a relative movement between the base 1 and the transport surface exists in response to a movement of the transport surface 4.

However, the base 1 can also be embodied so as to be displaceable so that, on movement of the transport surface 4, the base 1 is moved either in the same direction or in the opposite direction with the transport surface 4.

According to FIGS. 14 to 18, the base 1 can thus be a conveyor belt, for example that consists of a plurality of segments that are connected with one another in an articulated manner via elements by axles that are oriented perpendicular to the displacement direction.

A segment can be continuous across the entire width of the base 1. However, it is also quite possible that a segment consists of a plurality of partial segments that are connected with one another, as viewed over the width of the base 1.

In FIGS. 19 and 20, the base 1 is formed as a conveying surface that can be moved in the displacement direction 26 and that consists of a plurality of segments 25 that are connected with one another in an articulated manner via elements 24 by axles that are oriented perpendicular to the displacement direction 26. On its upper side, each segment 25 has a recess 22 that is formed as a groove extending orthogonally to the conveyor direction 14. When passing underneath, the front edge 12 of the transport surface 4 is located in a recess 22 so that the transport surface 4 can be slightly passed underneath the row of containers 2. In this embodiment, no relative movement should exist between the base 1 and the transport surface 4.

Figure 21:
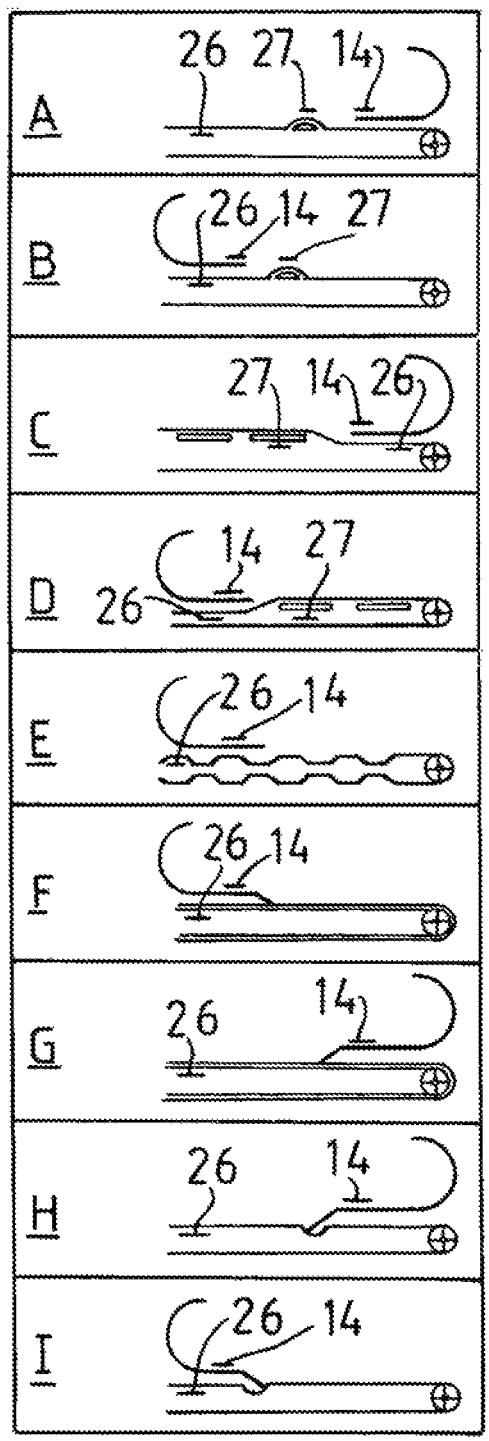
FIG. 21 shows views A to I for illustrating the possible directions of movement.

FIG. 21 illustrates possible directions of movement. The embodiment according to FIGS. 2 to 7 is illustrated in views A and B. The displacement direction 26 of the base 1 can thus be identical with the conveyor direction 14 of the transport surface 4 and with the displacement direction 27 of the lifter 13 that is illustrated in view B.

It goes without saying that the displacement direction 26 of the base 1 can be opposite to the conveyor direction 14 of the transport surface and the displacement direction 27 of the lifter 13.

Possible directions of movement in a lifter 13 consisting of two surface elements 17, 18 are illustrated in views C and D. View C relates to the embodiment according to FIGS. 8 to 13. In view D, the right-hand surface element 18 is disposed so as to be stationary, while the left-hand surface element 17 can be relocated. The conveyor direction 14 of the transport surface 4, the displacement direction 26 of the base 1 as well as the displacement direction 27 of the surface element 17 are then the same.

The directions of movement in the embodiment according to FIGS. 19 and 20 are illustrated in view E.

The directions of movement in the embodiment according to FIGS. 14 to 18 are illustrated in views F and G. As can be seen there, the conveyor direction 14 of the transport surface 4 can be in displacement direction 26 (view F) as well as opposite the displacement direction 26 (view G) of the base 1.

Views H and I illustrate an embodiment, in which the base 1 is "locally" lowered in the region that, on the one hand, borders on the row of containers 2, underneath which the transport surface 4 is relocated next and, on the other hand, faces the transport surface 4 that was not yet passed from below. The "lowered" region also moves around synchronously with the transport surface 4. Here, the conveyor direction 14 of the transport surface 4 can either be in the displacement direction 26 (view I) or opposite the displacement direction 26 (view H) of the base 1.

In the embodiments illustrated in the figures, the transport surface 4 formed as a blind is guided in two U-shaped rails that are disposed at a spacing from one another and which are fastened to the lifter 3. The distance is chosen to be such that the group of containers 2 does not touch the rails. In particular for economy of space, the ends of the rails are deflected upward or downward, as illustrated in FIGS. 8 to 13, for example.

I claim:

1. An apparatus for handling an array of objects, the apparatus comprising:
    a horizontal support having a flat and horizontal upper face defining and extending in a predetermined upstream-to-downstream conveyor direction underneath an accumulation region to a downstream end of the accumulation region;
    a flexible transport web overlying the support, the array of objects standing on the transport web and pressing same down against the support;
    a frame at the accumulation region for gathering the objects at the downstream end into a group having a plurality of rows transverse to the conveyor direction;
    a transport element formed as a blind of an array of transverse slats, having an end edge, and shiftable atop the transport web upstream away from the downstream end in the conveyor direction between a ready position with the end edge spaced from the group standing on the transport web and a pickup position underlying the entire group, the transport element being shiftable upstream in the conveyor direction away from the downstream end and on top of the transport web between the ready position and the pickup position; and
    a lifting element underneath the transport web and coupled for joint movement in the conveyor direction with the transport element such that on upstream movement of the transport element in the conveyor direction away from the downstream end from the ready position to the pickup position the transport web is raised immediately upstream in the conveyor direction of the end edge of the transport element to raise downstream edges of the objects and the transport element is engageable between the objects in the group and the transport web, whereby the transport element can slide underneath the objects in the group, the transport element being raisable in the pickup position to raise the group of objects up off the transport web.

2. The object-handling apparatus defined in claim 1, wherein the edge is wedge-shaped.

3. The object-handling apparatus defined in claim 1, wherein the transport element moves under the group without substantially moving the objects in the group horizontally relative to one another.

4. The object-handling apparatus defined in claim 1, wherein the lifting element has a structure physically connecting it to the transport element for joint movement in the direction.

5. The object-handling apparatus defined in claim 1, wherein movement of the lifting element is synchronized with shifting of the transport element for joint synchronized movement in the direction of the transport element and lifting element.

6. The object-handling apparatus defined in claim 1, wherein the lifting element is raisable on movement upstream in the direction above the face of the support and is lowerable for dropping below the face of the support on return movement downstream in the conveyor direction.

7. The object-handling apparatus defined in claim 1, wherein the transport web is a horizontal stretch of an endless conveyor belt advancing in the conveyor direction toward the accumulation area.

8. An apparatus for handling an array of objects, the apparatus comprising:
- a horizontal support defining and extending upstream against a conveyor direction from an accumulation region;
- a conveyor belt movable downstream in the conveyor direction on the support and defining a horizontal conveyor surface extending through the accumulation region and having a downstream end;
- a frame at the accumulation region at the downstream end of the conveyor surface for gathering the objects at the downstream end into a group having a plurality of rows;
- a transport element formed as a blind of an array of slats, having an end edge, and shiftable upstream and downstream in the conveyor direction between a ready position with the end edge spaced downstream from the group and a pickup position underlying the entire group and atop the conveyor surface, the transport element being shiftable upstream parallel to the conveyor direction and on top of the conveyor surface between the ready position and the pickup position; and
- a lifting element underneath the conveyor belt and coupled for joint movement upstream and downstream in the conveyor direction with the transport element such that, on upstream movement away from the accumulation region of the transport element, the belt is raised immediately upstream of the end edge of the transport element and the transport element is engageable between the objects in the group and the conveyor surface, whereby the transport element can slide underneath the objects in the group, the transport element being raisable after it slides underneath the group to pick the group of objects up off the conveyor surface.

* * * * *